March 19, 1940.   H. G. RENNER   2,193,841
INDICATING CAP FOR TIRE VALVES
Filed July 9, 1938

Inventor
Harold G. Renner
By
J.S. Murray
Attorney

Patented Mar. 19, 1940

2,193,841

UNITED STATES PATENT OFFICE 2,193,841

INDICATING CAP FOR TIRE VALVES

Harold G. Renner, Detroit, Mich.

Application July 9, 1938, Serial No. 218,373

4 Claims. (Cl. 116—34)

This invention relates to valve caps and particularly caps for closing the tubular stems of pneumatic tires.

An object of the invention is to provide a pressure-indicating valve cap of the type in which an indicator element is automatically projected from the cap when air or other gas pressure drops to a predetermined extent, and to mount in such indicator element a ball detent normally held against an interior shoulder of the cap, by the pressure of air or gas transmitted through a suitable diaphragm, such detent normally retracting the indicator element and releasing it upon the predetermined reduction of gas pressure.

Another object is to provide a pressure indicating valve cap, controlling an opening of a tire or other gas receiver, such opening being controlled by a valve held open by the valve cap mechanism when pressure is normal but automatically closed when pressure drops to a predetermined extent, whereby there is avoided the possibility of leakage through the valve cap, subsequent to a low pressure indication.

A further object is to adapt all of the parts of the pressure indicating mechanism to be held in proper assembly relation within the valve cap by a single member carried by the cap.

These and various other objects are attained by the construction hereinafter described and illustrated in the accompanying drawing, wherein.

Figure 1:
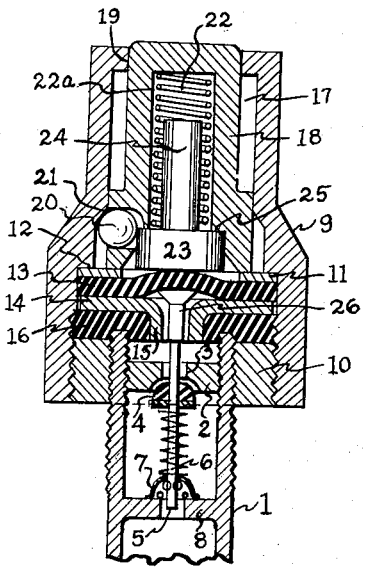
Fig. 1 is an axial sectional view of the improved cap, as applied to a tire valve stem, showing positions of the parts when normal pressure prevails in the tire.
Figure 2:
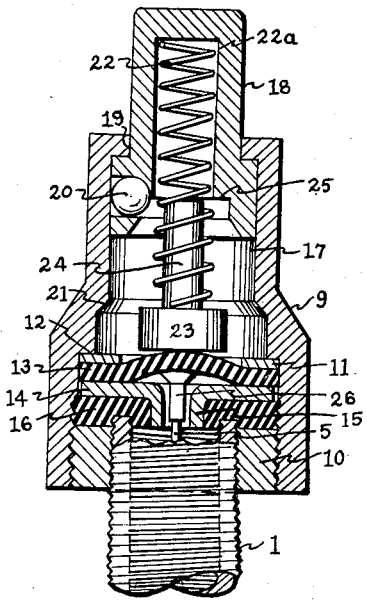
Fig. 2 is a similar view, showing the parts as disposed on response to a subnormal pressure.

In these views, the reference character 1 designates the usual tubular inflation stem of a tire, such stem carrying any ordinary valve mechanism adapted to retain air pressure, while affording inflation. Thus a plug 2 threaded into the stem 1 is formed with an axial air passage 3, and a valve member 4, usually rubber, is adapted to seat on such plug to close said passage. Said valve member is fixed on a pin 5 which projects inwardly from such member to mount a coiled spring 6 imposing pressure on the valve member to normally seat the same. An abutment 7 for the lower end of said spring is slidable on the pin 5, and a centrally apertured restriction 8 rigidly interiorly carried by the stem 1 serves to seat the abutment 7. The pin 5 has an outer portion freely extending through the passage 3 and projecting sufficiently beyond the plug 2 to permit of depressing said pin to unseat the valve member.

The present invention comprises a cap 9, exteriorly engaging the stem 1, preferably by threading a plug 10 into the inner end portion of the cap and forming such plug with a central opening threaded to exteriorly engage the stem. Within the cap, adjacent the plug 10, is provided an air seal comprising a metal washer 11, outwardly seating against an annular shoulder 12 of the cap, a flexible diaphragm 13, preferably of rubber, outwardly seating on said washer, a second metal washer 14 beneath the diaphragm, formed with a central inwardly projecting collar 15, and a packing washer 16, preferably of rubber, engaging the inner face of the washer 14 and snugly embracing the collar 15. The plug 10 is screwed into place tightly enough to compress marginal portions of the diaphragm and packing washer, so as to definitely eliminate any leakage of air marginally past such portions. When the cap is applied to the stem, the latter embeds itself, as shown, in the packing 16, eliminating any escape of air across the rim of the stem.

Outwardly of the described air seal, the cap is formed with a cylinder chamber 17, wherein an indicator element 18 is slidable to and from the stem, said element having its outer portion fitting in and conforming to a circular opening 19 leading into the chamber 17 through the top of the cap, and having an enlarged inner portion fitting within such chamber. Said element in its inner limiting position is flush with the outer end of the cap (see Fig. 1), and a ball detent 20 set into a laterally opening recess in the enlarged inner portion of said element, is engageable in said position with an annular beveled shoulder 21, formed interiorly of the cap, to maintain such position. In the outer limiting position of the element 18, it projects a considerable distance beyond the cap, its enlarged portion seating against the cap top.

Installed within a bore 22a extending outwardly into the element 18, is a coiled spring 22, urging said element outwardly, the inner end of such spring seating on a disk 23 which transmits the spring thrust to the diaphragm 13, and said disk preferably carrying a pin 24 engaged within the coils of the spring to maintain the disk properly centered beneath the spring. Under normal pressure conditions within the tire (not shown) equipped with the stem 1, the element 18 is in its inner position, and the spring 22 is highly compressed, air pressure against the inner face of the diaphragm being adequate to hold the disk 23 outwardly pressed against an annular shoulder 25 formed interiorly of said element. To permit the pressure of air in the tire to act on the diaphragm, under such conditions, a pin 26 is freely mounted in the collar 15, and is proportioned in length to engage and depress the pin 5, so as to unseat the valve 4. When the disk 23 engages the shoulder 25, as described, it also engages the detent 20, holding the latter in its outwardly projecting position of engagement with the beveled shoulder 21. When air pressure within the tire drops below a predetermined value, the spring pressure on the disk 23 overcomes the pressure of air thereon and the disk moves inward slightly, flattening out the diaphragm and permitting the detent to retract and disengage the shoulder 21. Thereupon the spring 22 immediately thrusts the indicator element to its projecting position. Preferably the indicator element will be of a red color and the cap itself of a black or other contrasting color to more fully symbolize an abnormal condition when said element is in projecting position.

It is to be noted that when the indicating element 18 is in its projected position, the spring 22 is so relaxed as to relieve pressure on the disk 23, diaphragm 13 and pin 26, so that under such conditions, the valve 4 is permitted to seat.

A feature of the construction is the fact that the valve 4 is not unseated unless the cap is screwed firmly enough on the stem 1 to embed the latter in the packing 16. Thus there can be no deflation of a tire due to loosely applying the cap.

By using springs 22 of different strengths, the described device can be readily adapted to different air pressures. In addition to its indicating function, the described cap serves to positively prevent leakage from a tire valve stem, in case air leaks past the valve 4 within such stem.

When the cap or closure 9 is removed, the indicator element 18 of course assumes its projected or signaling position. After the cap has been applied to the stem or tube 1, said element is manually actuated to its inner position, and the detent retains it in such position, unless tire pressure is subnormal.

The invention is presented as including all such modifications and changes as come within the scope of the following claims.

What I claim is:

1. A pressure indicating closure for an opening of a receiver for a gas under pressure, such receiver housing a valve element yieldably seated to control such opening, said closure comprising a cap attachable to the receiver and having an interior abutment, and having its outer end formed with an opening, an indicator element slidable within and substantially axially of the cap and adapted to project through said opening in an outer or warning position, said indicator element being hollow and having a recess in a wall thereof, a detent mounted in said recess and engageable with said abutment to normally maintain a retracted position of the indicator element, a control element normally substantially received within the indicator element, and projecting in such normal position into the detent recess and holding the detent in engagement with said abutment, a diaphragm carried by the cap and subject to pressure of said gas, and normally applying such pressure to said control element to maintain engagement of such element with the detent, and a spring reacting between the indicator element and control element to retract the control element from the detent upon a predetermined pressure drop and to thereupon establish the projected position of the indicator element.

2. A pressure indicating closure for an opening of a receiver for a gas under pressure, such receiver having a valve element yieldably seated to control such opening, said closure comprising a cap attachable to the receiver having a substantially annular interior shoulder, an indicator element housed within the cap and slidable to and from the valve element from a normal position to a warning position, a ball detent received in and slidable with the indicator element and normally laterally projecting from such element to engage the shoulder of the cap to maintain the normal position of said element, a diaphragm reacting to pressure of said gas and normally maintaining the detent in its shoulder-engaging position responsive to such pressure, and adapted to release the detent responsive to a predetermined reduction of such pressure, a spring reacting between the indicator element and diaphragm, urging such element to its warning position and opposing gas pressure on the diaphragm, and a control member transmitting the reaction of said spring to the diaphragm and transmitting the reaction of the diaphragm to said detent.

3. A pressure indicating closure for an opening of a receiver for a gas under pressure, such receiver housing a valve element yieldably seated to control such opening, said closure comprising an indicator element movable from a normal position to a warning position, a diaphragm normally subject to and predeterminedly distended by the pressure of gas discharged from said receiver, a detent normally retaining the indicator element in its normal position, a spring interposed between the indicator element and diaphragm, resisting distention of the diaphragm and urging the indicator element toward its warning position, a control element interposed between the spring and diaphragm and transmitting the spring thrust to the diaphragm and normally held by the diaphragm in a position to maintain the effective position of the detent, and a thrust member interposed between the diaphragm and valve element, and movable by the diaphragm to normally transmit an unseating thrust to the valve element from the diaphragm and thus subject the diaphragm to receiver gas pressure, the diaphragm and control element being afforded retraction by a predetermined reduction in said gas pressure, whereby the detent escapes from its effective position and the indicator element responds to the spring and affords a relaxation of the spring such that the diaphragm may distend abnormally under gas pressure, thereby relieving thrust on the thrust member and permitting the valve element to close.

4. A pressure indicating closure as set forth in claim 3, the indicator element providing a seat and the control element being engaged with such seat by the diaphragm when the indicator element is in normal position and the diaphragm is normally distended.

HAROLD G. RENNER.